(12) United States Patent
Hayashi et al.

(10) Patent No.: US 7,631,321 B2
(45) Date of Patent: Dec. 8, 2009

(54) LENS PROTECTOR AND OPTICAL PICK-UP

(75) Inventors: Takumi Hayashi, Mie (JP); Kazuo Hirose, Mie (JP)

(73) Assignee: NTN Corporation, Osaka (JP)

( * ) Notice: Subject to any disclaimer, the term of this patent is extended or adjusted under 35 U.S.C. 154(b) by 813 days.

(21) Appl. No.: 11/249,104

(22) Filed: Oct. 12, 2005

(65) Prior Publication Data
US 2006/0087932 A1    Apr. 27, 2006

(30) Foreign Application Priority Data
Oct. 21, 2004    (JP)    ............... 2004-307261

(51) Int. Cl.
G11B 7/00    (2006.01)
(52) U.S. Cl. ..................................... 720/671
(58) Field of Classification Search ................ 720/671
See application file for complete search history.

(56) References Cited

U.S. PATENT DOCUMENTS

| | | | | |
|---|---|---|---|---|
| 5,469,425 A | * | 11/1995 | Nishizawa | .................. 369/189 |
| 5,635,268 A | * | 6/1997 | Miyake et al. | ............. 428/64.1 |
| 6,198,715 B1 | * | 3/2001 | Kouno et al. | ................. 720/702 |
| 6,882,528 B2 | * | 4/2005 | Chuang | ...................... 361/685 |
| 2001/0019534 A1 | * | 9/2001 | Mohri et al. | ................. 369/247 |
| 2003/0107973 A1 | * | 6/2003 | Makino et al. | ............. 369/75.2 |
| 2003/0174634 A1 | * | 9/2003 | Tanaka | .................. 369/112.23 |

FOREIGN PATENT DOCUMENTS

| | | | |
|---|---|---|---|
| CN | 1424716 A | | 6/2003 |
| EP | 1 431 343 A | | 6/2004 |
| JP | 57026866 A | * | 2/1982 |
| JP | H02-54433 | | 2/1990 |
| JP | 05-144041 | | 6/1993 |
| JP | H11-312322 | | 11/1999 |
| JP | 2001-319355 A | | 11/2001 |
| JP | 2002036718 A | * | 2/2002 |
| JP | 2003-242703 | | 8/2003 |

* cited by examiner

*Primary Examiner*—Peter Vincent Agustin
(74) *Attorney, Agent, or Firm*—James V. Costigan; Hedman & Costigan, P.C.

(57) ABSTRACT

The lens protector serving as a means for preventing a scratch of an objective lens and an optical disc of the optical pick-up in which a signal-recording surface of the optical disc is irradiated with light beams to read signals from the signal-recording layer and/or record signals on the signal-recording layer. The lens protector is a molding of silicone rubber and has a rubber hardness not more than 40°, when the rubber hardness is measured in accordance with JIS-A.

12 Claims, 3 Drawing Sheets

LENS PROTECTOR AND OPTICAL PICK-UP

BACKGROUND OF THE INVENTION

The present invention relates to a lens protector to be mounted on the periphery of an objective lens and an optical pick-up having the lens protector.

When an impact is unexpectedly applied to the optical pick-up during recording of signals on a CD or a DVD or during reproduction of signals therefrom, an objective lens or a signal-recording surface of an optical disc may be scratched. The optical pick-up having the function of condensing light for the CD and the DVD by the same lens has a problem that the objective lens collides with the optical disc owing to the difference in the working distance between the CD and the DVD and consequently the objective lens or the signal-recording surface of the optical disc may be scratched. Instead of the conventional semiconductor laser, development of a helium neon laser capable of recording more information than the conventional semiconductor laser is being made recently. In the helium neon laser, the interval between the objective lens and the optical disc is short. Owing to the degree of accuracy of the optical disc itself and the flexure of the optical disc during an operation, the objective lens and the optical disc may collide with each other. Thus there is a possibility that the objective lens and the signal-recording surface of the optical disc are scratched.

In a Blu-ray Disc and the like, the capacity and density of the optical disc have increased greatly in recent years. Thus the work space, namely, the interval between the objective lens and the surface of the optical disc has become very short when a focus servo is in operation. Consequently the danger of a possible collision between the objective lens and the optical disc has increased. Owing to the increase in the capacity and density of the optical disc, a protection layer covering the signal-recording layer of the optical disc has become thinner. Therefore the Blu-ray Disc and the like have a problem that owing to the collision between the objective lens and the optical disc, the signal-recording layer of the optical disc is liable to be scratched.

To solve the problem that the objective lens of the optical pick-up and the signal-recording surface of the optical disc thereof are scratched, the following proposals are made: A portion of the movable part of the actuator of the optical pick-up nearest to the optical disc is formed of the plastic softer than the plastic of the optical disc (refer to Japanese Patent Application Laid-Open No. 2-54433). The protector made of silicone rubber is mounted on the periphery of the objective lens (refer to Japanese Patent Application Laid-Open No. 11-312322). The cushioning material such as felt made of wool is mounted on the periphery of the objective lens (refer to Japanese Patent Application Laid-Open No. 2593998). The present applicant proposed the scratch prevention coating film (refer to Japanese Patent Application Laid-Open No. 2003-242703) formed on the periphery of the objective lens to prevent the optical disc from being scratched. The scratch prevention coating film contains urethane resin as its base component, polyurethane particles, and fluororesin powder.

However, in a recently developed optical pick-up (Blu-ray Disc or the like) using the DVD or the helium neon laser, a scratch on the signal-recording surface of the optical disc and that of the objective lens affect the reading performance of the optical disc adversely. Therefore it is difficult for even the protector, (disclosed in Japanese Patent Application Laid-Open No. 2-54433) of the optical pick-up, made of polyacetal resin softer than the plastic of the optical disc to completely prevent the signal-recording surface of the optical disc from being scratched. As described above, the scratch affects the reading performance of the optical disc adversely when the protector and the optical disc collide with each other.

It is difficult for the protector (disclosed in Japanese Patent Application Laid-Open No. 11-312322), made of the silicone rubber, which is mounted on the periphery of the objective lens to completely prevent the signal-recording surface of the optical disc from being scratched.

In the proposal that the cushioning material (disclosed in Japanese Patent Application Laid-Open No. 2593998) such as felt is mounted on the periphery of the objective lens, the cushioning material creeps and elastically deforms greatly. Thus it is difficult for the cushioning material to completely prevent the collision between the objective lens and the optical disc. As another problem of the cushioning material, dust such as waste thread is rubbed off the cushioning material and scatters in the optical pick-up, thus causing a failure.

The scratch prevention coating film (disclosed in Japanese Patent Application Laid-Open No. 2003-242703) containing the polyurethane resin is capable of coping with the problems of the above-described patent documents. But it is essential to mask the scratch prevention coating film in the manufacturing process. In the Blu-ray Disc using a very small objective lens and lens holder, it is difficult to mask the scratch prevention coating film when the diameter of the objective lens is not more than 5 mm.

SUMMARY OF THE INVENTION

It is an object of the present invention to provide a lens protector which does not scratch an optical disc, even though the lens protector contacts the optical disc such as a Blu-ray Disc whose signal-recording surface is scratched easily. It is another object of the present invention to provide an optical pick-up having the lens protector and an objective lens having a diameter not more than 5 mm.

In the first aspect of the present invention, there is provided a lens protector mounted at a portion of an upper surface of a lens holder opposed to an optical disc to prevent a scratch of an objective lens and the optical disc of an optical pick-up in which a signal-recording surface of the optical disc is irradiated with light beams to read signals from the signal-recording layer and/or record signals on the signal-recording layer. The lens protector is a molding of silicone rubber and has a rubber hardness not more than 40°, when the rubber hardness is measured in accordance with JIS-A. The rubber hardness of the lens protector is more favorably in the range from 10° to 40°. The "rubber hardness" described below is measured in accordance with JIS-A.

The silicone rubber is a silicone rubber composition containing at least one ingredient consisting of polyurethane particles and fluororesin powder.

The mixing amount of the ingredient for the entire silicone rubber composition containing the ingredient is 10 to 60% by weight.

The fluororesin powder and/or the polyurethane particles are spherical. The polyurethane particles are hollow.

In the second aspect of the present invention, there is provided an optical pick-up in which a signal-recording surface of an optical disc is irradiated with light beams to read signals from the signal-recording layer and/or record signals on the signal-recording layer. The optical pick-up has an objective lens through which the light beams are irradiated to the signal-recording layer, a lens holder for supporting the objective lens, and a lens protector disposed at a portion of the lens holder opposed to the optical disc. The lens protector is the lens protector of the above-described first aspect.

The present inventors have found that when the lens protector and the optical disc contact each other, it is possible to soften the attackability of the lens protector made of the silicone rubber on the optical disc. The present inventors have also found that by setting the rubber hardness of the lens protector to not more than 40°, it is possible to prevent the optical disc from being scratched owing to impact absorption caused by an elastic deformation of the lens protector and owing to the difference in the hardness between the lens protector and the optical disc.

The present inventors have also found that by adding the ingredient consisting of the polyurethane particles and/or the fluororesin powder to the silicone rubber, it is possible to improve non-attackability of the lens protector shaped by molding the silicone rubber composition on the optical disc. By adding the fluororesin powder and the polyurethane particles to the silicone rubber, the molding can be provided with excellent sliding performance. The degree of adhesion of the silicone rubber to the fluororesin as well as the polyurethane particles is low. Therefore owing to a shear of the interface of the silicone rubber and the fluororesin as well as the polyurethane particles, the lens protector is capable of absorbing an impact applied to the lens protector at the time when the lens protector and optical disc contact each other. The present inventors have also found that as the degree of the roundness of the fluororesin and that of the polyurethane particles become higher, the impact-absorbing effect of the lens protector becomes increasingly high.

The present invention is based on the above-described knowledge.

The lens protector of the present invention is the molding of the silicone rubber. Especially, the lens protector of the present invention is the molding of the silicone rubber composition containing the silicone rubber and the ingredient, consisting of the polyurethane particles and the fluororesin powder, which is added to the silicone rubber. Therefore the lens protector can be mounted easily on the objective lens and the lens holder and is applicable to an optical disc apparatus having the objective lens whose diameter is not more than 5 mm. Even when the lens protector contacts the signal-recording surface of the optical disc, the lens protector does not scratch the signal-recording surface of the optical disc. The lens protector is particularly effective for an optical pick-up such as the Blu-ray Disc or the like, because in the Blu-ray Disc or the like, the performance of reading signals of the optical disc is affected to a higher extent than the conventional optical pick-up by the scratch on the signal-recording surface of the optical disc and the objective lens.

Since the optical pick-up of the present invention has the above-described lens protector, the optical pick-up can be preferably used as the Blu-ray Disc and the like.

DETAILED DESCRIPTION OF THE PREFERRED EMBODIMENTS

Figure 1A:
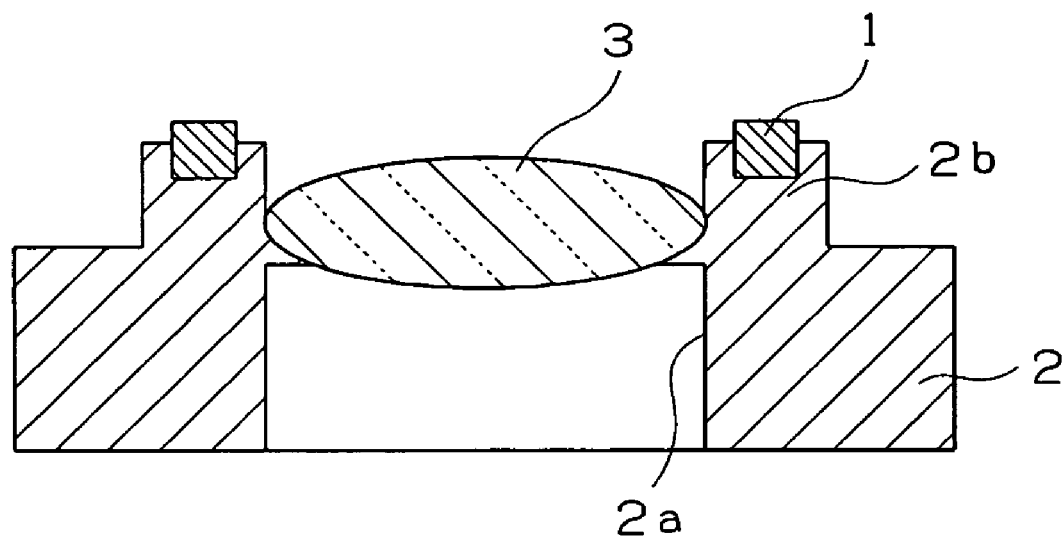
FIGS. 1A and 1B are enlarged sectional view showing an objective lens.

The lens protector of the present invention is a molding of silicone rubber and preferably a molding of a silicone rubber composition containing the silicone rubber and a ingredient, consisting of polyurethane particles and fluororesin powder, which is added to the silicone rubber. The rubber hardness of the silicone rubber composition measured in accordance with JIS-A is not more than 40°.

As the silicone rubber, it is possible to use so-called Mirabelle-type silicone rubber consisting of straight-chain polyorganosiloxane which has a high polymerization degree and can be treated in a method similar to the method of treating natural rubber; and liquid silicone rubber, consisting of the polyorganosiloxane having crosslinking groups, which is made elastic by cast-molding liquid polyorganosiloxane pasty or flowable. As the liquid silicone rubber, it is possible to use addition-type liquid silicone rubber or condensation-type liquid silicone rubber. The silicone rubber is composed of crude rubber and fillers such as a vulcanizing agent, a processing aid, a rubber hardness-adjusting agent, and the like added to the crude rubber.

As the crude rubber (silicone polymer) serving as the main material of the silicone rubber, it is possible to use dimethyl-containing crude rubber, methyl vinyl-containing crude rubber, methylphenyl vinyl-containing crude rubber, and methylfluoroalkyl-containing crude rubber. It is preferable to use the silicone rubber containing the dimethyl-containing crude rubber that is easily obtainable and inexpensive.

The silicone rubber that is used in the present invention has a rubber hardness which allows the lens protector which is the molding of the silicone rubber to have a rubber hardness not more than 40°. It is necessary to adopt the silicone rubber which allows the rubber hardness of the molded silicone rubber composition to fall in the above-described range.

The rubber hardness of the lens protector is favorably in the range from 10° to 40° and more favorably in the range from 20° to 30°. If the rubber hardness of the lens protector exceeds 40°, the signal-recording surface of the optical disc is liable to be scratched because of a high hardness thereof. When the rubber hardness is less than 10°, there is a possibility that a shearing resistance on the surface of contact between the lens protector and the optical disc is high and thus the signal-recording surface of the optical disc is scratched.

The rubber hardness of the silicone rubber composition containing the polyurethane particles and/or the fluororesin powder is higher than that of the silicone rubber. Thus in using the silicone rubber composition containing the polyurethane particles and/or fluororesin powder, it is necessary to adopt the silicone rubber which allows the molded silicone rubber composition to have a rubber hardness falling in the above-described range.

It is possible to use the silicone rubber satisfying the above-described specified range of the rubber hardness of the molded silicone rubber composition. For example, it is possible to use commercially available silicone rubber produced by Shin-Etsu Chemical Co., LTD., GE Toshiba Silicone Inc., and WACKER ASAHIKASEI SILICONE CO., LTD.

The polyurethane particles that can be used in the present invention are the elastic powder of the polyurethane resin. In addition to the spherical polyurethane particles, it is possible to use special-shape powder produced by pulverizing the polyurethane.

In the molding containing the polyurethane particles, the elastic polyurethane particles project partly from the surface of the coating film of the molding. Owing to the effect of the elasticity of the elastic particles and the projection-caused effect of reducing the area of contact between the lens protector and the optical disc, it is possible to restrain the lens protector from attacking the optical disc, even if the lens protector contacts the optical disc.

The interface of the silicone rubber and the polyurethane particles does not have a high degree of adhesiveness. Further an impact energy can be absorbed by a shear of the interface of the silicone rubber and the polyurethane particles. Thereby it is possible to prevent the lens protector from scratching the optical disc. By adding the hollow polyurethane particles to the silicone rubber, the absorption of the impact energy can be accelerated. Thus it is possible to prevent the lens protector from scratching the optical disc to a higher extent.

The mean diameter of the polyurethane particles is favorably not more than 150 μm and more favorably not less than 5 μm nor more than 50 μm. If the particle diameter of the polyurethane particles is too large, the polyurethane particles are liable to be eliminated from the molding. Thus the period of time in which the scratch prevention effect of the polyurethane particles can be displayed may shorten. The spherical polyurethane particles are especially preferable because the molding containing the spherical polyurethane particles is excellent in unattackability on the mating member and in absorbing the impact when the molding contacts the mating member. The hollow polyurethane particles are especially preferable in absorbing the impact.

As the polyurethane particles, it is possible to use "BURN-OCK CFB100" of "BURNOCK CFB series" (commercial name) produced by DAINIPPON INK AND CHEMICALS Inc.

The fluororesin particles which can be used in the present invention contain fluorine. The following fluororesin powder can be used in the present invention: polytetrafluoroethylene (PTFE), tetrafluoroethylene-perfluoroalkylvinyl ether copolymer (PFA), tetrafluoroethylene-hexafluoropropylene copolymer (FEP), ethylene-tetrafluoroethylene copolymer (ETFE), tetrafluoroethylene-fluoroalkylvinyl ether-fluoroolefin copolymer (EPE), polychlorotrifluoroethylene (PCTFE), ethylene-chlorotrifluoroethylene copolymer (ECTFE), polyvinylidene fluoride (PVDF), and polyvinyl fluoride (PVF). The PTFE powder is most favorable of these fluororesin powder because it is excellent in its frictional property and available at a low cost.

The PTFE powder which can be used in the present invention is a high polymer molecule which consists of a large number of recurring units of —$CF_2$—$CF_2$— and has a very low friction coefficient. The PTFE powder reduces friction between the lens protector and the optical disc owing to its sliding property when both contact each other, thereby improving the scratch prevention effect. The mean particle diameter of the PTFE powder is favorably not more than 50 μm and more favorably not more than 20 μm. If the mean particle diameter of the PTFE powder exceeds 50 μm, the period of time in which the scratch prevention effect of the polyurethane particles can be displayed may shorten.

The fluororesin three-dimensional and particularly spherical is especially preferable because the molding containing the spherical fluororesin powder is excellent in unattackability on the mating member and in absorbing the impact when the molding contacts the mating member.

As the PTFE powder, it is possible to use "Lubron L-2" and "Lubron L-5" (commercial name) produced by Daikin Industries, LTD.; "Fluon L155J" and "Fluon L170J" (commercial name) produced by ASAHI GLASS CO., LTD.; "Dinion TF9202, TF9205, and TF9207" produced by Sumitomo 3M LTD.; and "KTL-8N and KTL-610" produced by Kitamura LTD.

It is preferable that the mixing amount of the ingredient for the entire silicone rubber composition containing the silicone rubber and the ingredient is 10 to 60% by weight. Thus for example, when the mixing amount of the polyurethane particles for the entire silicone rubber composition is 30% by weight, the mixing amount of the fluororesin powder is set to 0 to 30% by weight.

The mixing amount of the polyurethane particles for the silicone rubber composition containing the polyurethane particles is favorably 10 to 60% by weight. If the mixing amount of the polyurethane particles is less than 10% by weight, the effect of preventing the mating member from being scratched is not outstanding. If the mixing amount of the polyurethane particles is more than 60% by weight, the area of contact between the silicone rubber and the polyurethane particles is small. Consequently there is a possibility that the adhesion of the polyurethane particles to the silicone rubber deteriorates, the property of the molding deteriorates, and the moldability of the silicone rubber composition deteriorates. Thereby the obtained molding is nonuniform. In addition, there is a possibility that the molding cracks when it is taken out of a die and has a low durability for frictional wear. The mixing amount of the polyurethane particles for the entire silicone rubber composition is more favorably 20 to 40% by weight in view of moldability of the silicone rubber composition and the dimensional accuracy and cost of the molded silicone rubber composition.

The mixing amount of the fluororesin powder for the silicone rubber composition containing the fluororesin powder is favorably 10 to 60% by weight. If the mixing amount of the fluororesin powder is less than 10% by weight, the effect of preventing the mating member from being scratched is not outstanding, and the molding is incapable of displaying a sufficient friction-reducing effect. If the mixing amount of the fluororesin powder is more than 60% by weight, the obtained molding is unstable and the property thereof deteriorates conspicuously. Thus there is a possibility that the molding does not display a high durability for frictional wear. Further the obtained molding is nonuniform. In addition, there is a possibility that the molding cracks when it is taken out of the die. The mixing amount of the fluororesin powder for the entire silicone rubber composition is more favorably 20 to 40% by weight in view of the moldability of the silicone rubber composition and the dimensional accuracy and property of the molded silicone rubber composition.

The silicone rubber composition to be shaped into the lens protector of the present invention is obtained by mixing the ingredient containing the polyurethane particles and/or the fluororesin powder with the silicone rubber and dispersing the ingredient in the silicone rubber. The silicone rubber composition can be prepared by using a known mixer such as an open roll, a kneader, a Banbury mixer, and the like.

The lens protector of the present invention is obtained by shaping the silicone rubber or the silicone rubber composition into a predetermined configuration. A desired molding method can be adopted in dependence on a desired configuration of the molding and the properties (Mirabelle type, liquid) of the selected silicone rubber.

For example, similarly to ordinary organic rubber, the Mirabelle silicone rubber is shaped by heating compressing molding, injection molding, and transfer molding. The molding temperature and the molding period of time are determined in dependence on the kind of a vulcanizing agent and the dimension of a product. The liquid silicone rubber is shaped by transfer molding, skin molding, welder molding, and liquid injection molding.

The lens protector of the present invention is mounted on an objective lens of an optical pick-up or on a lens holder thereof to prevent a recording face of an optical disc from contacting the objective lens.

The lens protector of the present invention is described below with reference to FIG. 1A and FIG. 1B that are an enlarged sectional view respectively showing one example of an objective lens part.

Figure 1B:
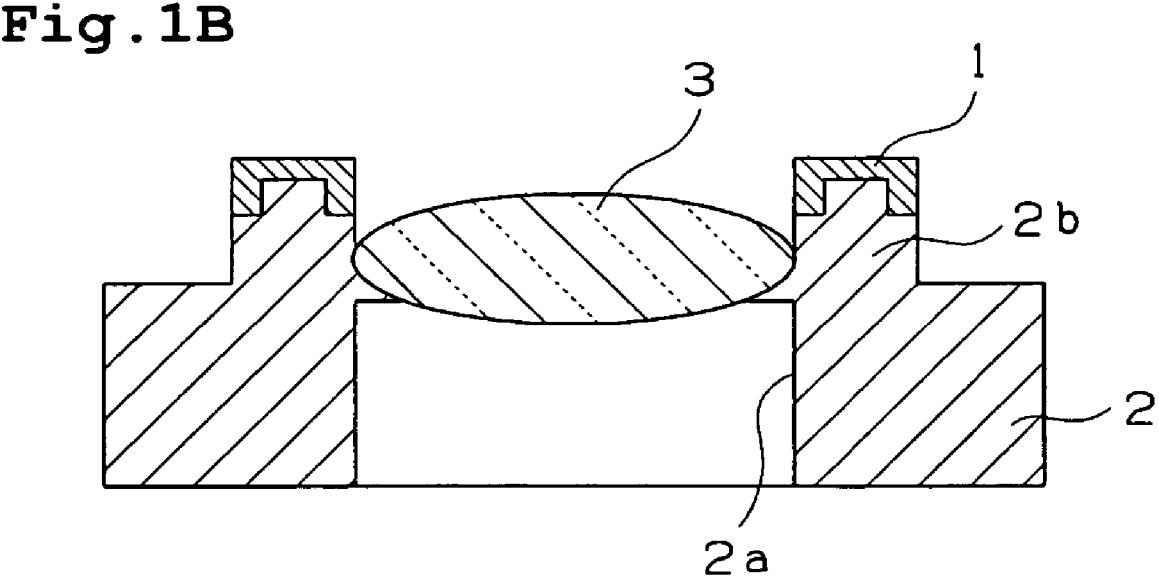

As shown in FIGS. 1A and 1B, an objective lens 3 is mounted on a lens-mounting portion 2a provided on a lens holder 2. A lens protector 1 is provided at a portion of an upper surface of the lens holder 2, namely, a portion 2b opposed to an optical disc (not shown). The lens protector 1 is mounted on the lens holder 2 after the silicone rubber composition is formed into a molding by using the above-described molding method. As the method of mounting the lens protector 1 on the lens holder 2, press fit or bonding using an adhesive agent can be adopted as desired.

Because the molding is mounted on the objective lens or the lens holder, the lens protector can be mounted thereon, even though the objective lens or the lens holder is very small, for example, even though the diameter of the objective lens is not more than 5 mm. Because it is unnecessary to mask the molding, the manufacturing process can be simplified.

The upper surface of the lens protector 1 is set higher than the upper surface of the objective lens to prevent the upper surface of the objective lens from directly contacting the signal-recording surface of the optical disc. The lens protector 1 is provided to prevent the signal-recording surface of the optical disc from contacting the objective lens 3. Even if the signal-recording surface of the optical disc contacts the lens holder 2, the lens protector 1 having excellent impact-absorbing property prevents the objective lens 3 from scratching the signal-recording surface of the optical disc.

Figure 2:
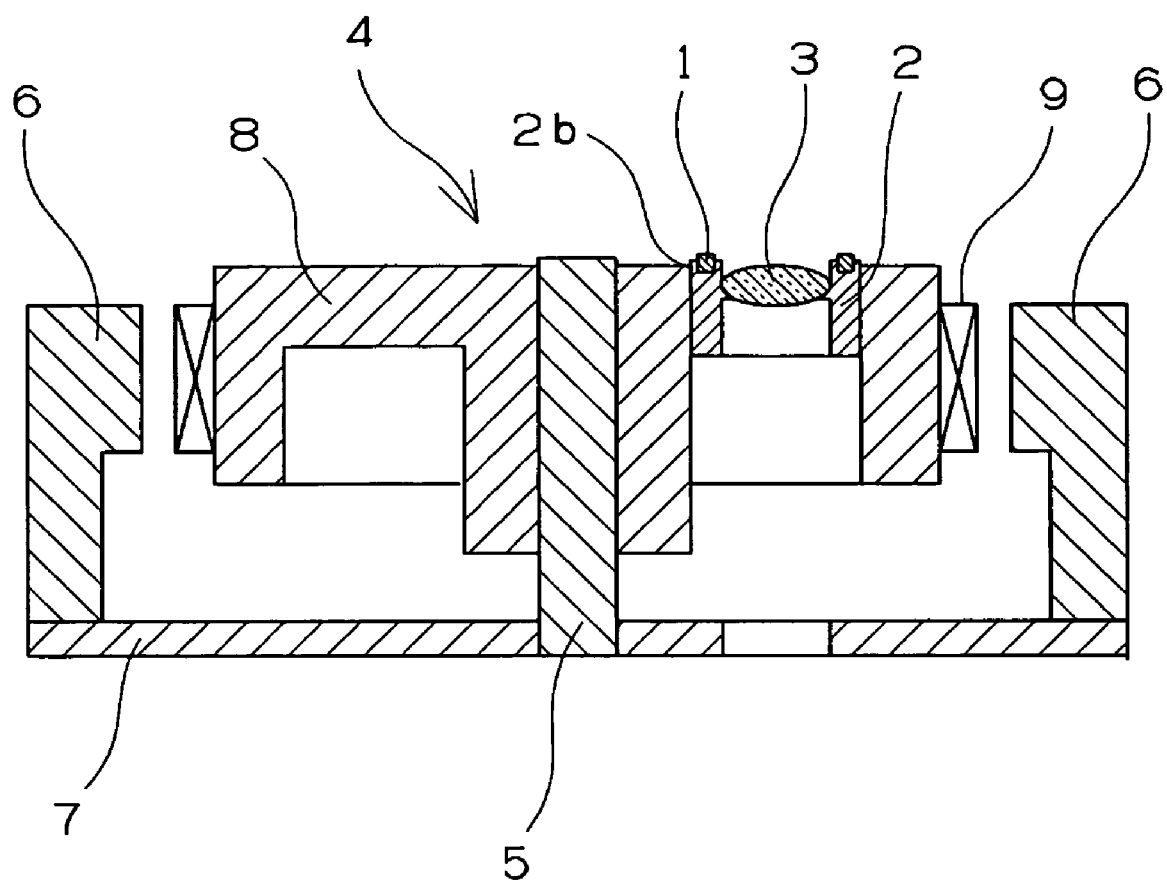
FIG. 2 is a sectional view showing an optical pick-up having a lens protector of the present invention.

An example of an optical pick-up having the lens protector of the present invention is described below with reference to FIG. 2. FIG. 2 is a sectional view showing an optical pick-up adopting a driving part-supporting system using a supporting shaft. The optical pick-up is a kind of an optical disc apparatus, thus recording signals from the signal-recording layer of the optical disc and/or recording signals therein by irradiating the signal-recording layer of the optical disc with light beams.

A driving part of an optical pick-up 4 moves in a focusing direction under the guide of a stationary supporting shaft 5 to perform a focusing control, while the driving part is rotating on the supporting shaft 5 to perform a tracking control. Both the supporting shaft 5 and a magnetic core 6 disposed on the periphery thereof are fixed to a base 7. A lens holder support 8 is rotatably fitted on the supporting shaft 5. A driving coil 9 is provided on a peripheral surface of the lens holder support 8. A lens holder 2 holding an objective lens 3 for irradiating a signal-recording layer of the optical disc with light beams at a lens-mounting portion 2a thereof is mounted on the lens holder support 8 at an eccentric position thereof. A lens protector 1 is mounted at a portion of the upper surface of the lens holder 2, namely, a portion 2b opposed to the optical disc (not shown). The driving coil 9 includes a focusing coil wound round the shaft of the lens holder support 8 and tracking coils (not shown) coils disposed symmetrically with respect to a plane including the shaft of the lens holder support 8 and wound round shafts orthogonal to the shaft of the lens holder support 8. The axial movement amount of the lens holder support 8 and its rotation amount are controlled according to an intensity of electric current flowing through the focus coil and the tracking coil.

As described above, because the capacity and density of the optical disc have increased in recent years, the interval between the objective lens 3 and the signal-recording surface of the optical disc has become short. Therefore in the optical pick-up 1 shown in FIG. 2, the signal-recording surface of the optical disc may contact the portion 2b, of the lens holder 2 holding the objective lens 3, which confronts the optical disc. In the optical pick-up of the present invention, the lens protector 1 is mounted at the portion 2b to prevent the signal-recording surface of the optical disc from being scratched.

EXAMPLES 1 THROUGH 9

The components were mixed with one another at the mixing ratio shown in table 1 by using a kneader to obtain a rubber composition of each of the examples 1 through 9 to be shaped into the lens protector. In table 1, as the "Silicone rubber", "ELASTOSIL EL series" or "LR series" produced by WACKER ASAHIKASEI SILICONE CO., LTD. was used by varying rubber hardnesses thereof. As the "Polyurethane particles (spherical)", "BURNOCK CFB" produced by DAINIPPON INK AND CHEMICALS. INC. was used. As the "PTFE resin (bulk)", "KTL 610" produced by Kitamura LTD. was used. As the "PTFE resin (spherical)", "KTL 8N" produced by Kitamura LTD. was used.

After the obtained rubber compositions were sheeted in the thickness of 2 mm, the rubber compositions were molded by using a die at 180° C. for five minutes to obtain semispherical pins each having a diameter of $\phi$ 5 mm and a length of 10 mm. In this manner, a specimen for evaluating each lens protector was obtained. As the mating member with the specimens, a CD-R manufactured by TAIYO YUDEN CO., LTD. was adopted to evaluate the specimens by using a pin-on disc type frictional wear testing apparatus (conforming to JIS K 7218).

Figure 3:
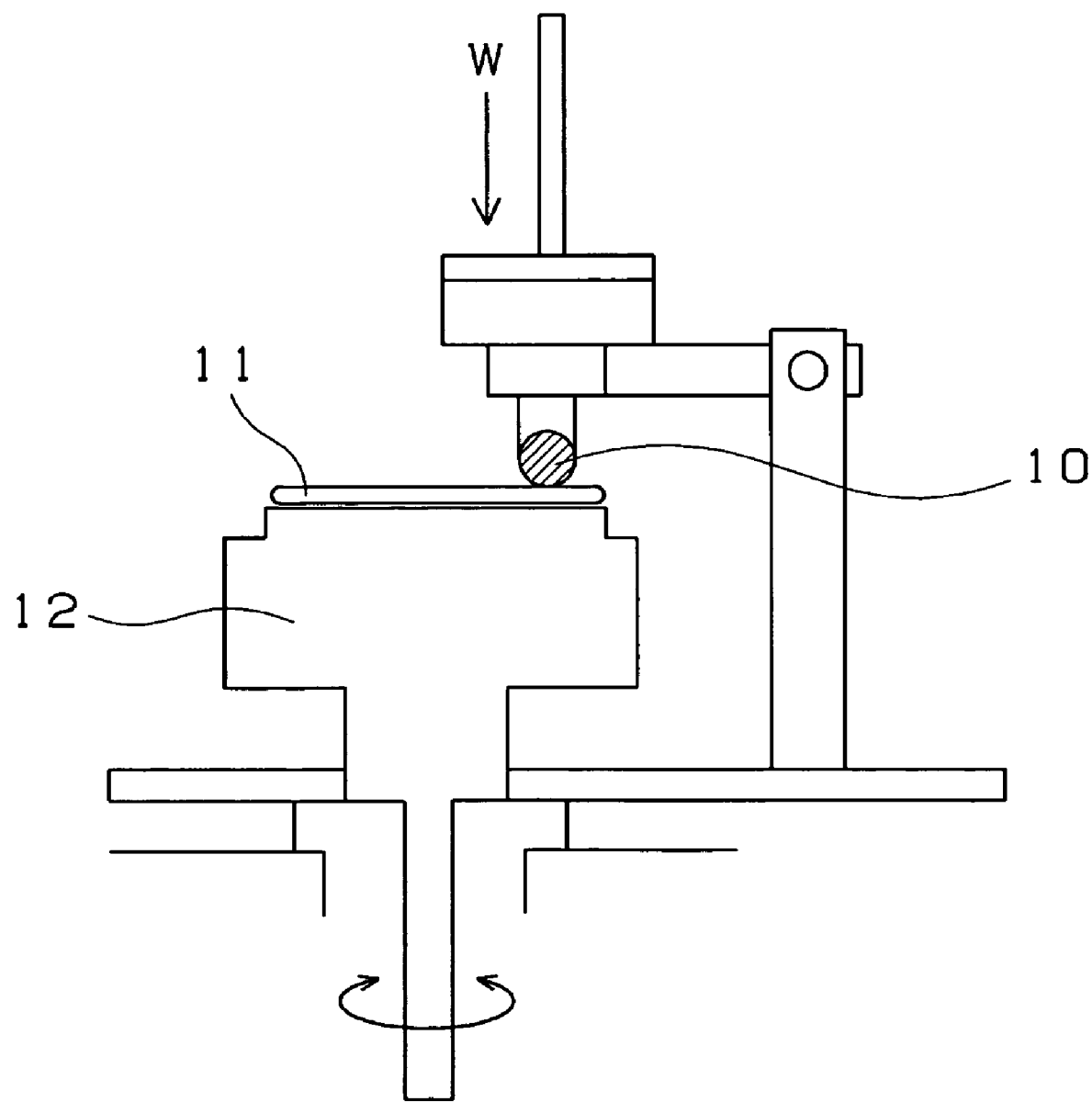
FIG. 3 is a schematic view showing a pin-on disc type frictional wear testing apparatus.

FIG. 3 is a schematic view showing the pin-on disc type frictional wear testing apparatus. In FIG. 3, reference numerals 10, 11, and 12 denote the specimen, the mating member CD-R, and a frame respectively. The specimen 10 was brought into contact with the signal-recording surface of the CD-R 11, with a load W kept applied to the specimen 10. In this state, the frame 12 was rotated for 10 minutes at a sliding speed of 7.2 m/minute with loads of 0.2N, 0.4N, and 0.6N applied to the specimen 10 to frictionally wear the signal-recording surface. After the test finished, the degree of a scratch on the CD-R 11 and the wear resistance of the lens protector were evaluated.

The degree of a scratch on the signal-recording surface was examined by observing the surface of each specimen with a microscope having a magnification of ×6 after the test finished to measure the width of each scratch. As the evaluation standard, specimens having no scratch were marked by "⊙". Specimens having a scratch whose width was not more than 0.05 mm were marked by "○". Specimen having a scratch whose width was not less than 0.05 mm and less than 0.2 mm were marked by "Δ". Specimen having a scratch whose width was not less than 0.2 mm were marked by "X".

The wear resistance of the lens protector was examined by observing the surface of each CD with the microscope having the magnification of ×6 after the test finished to measure the diameter of a worn portion. Specimens on which the worn portion was not admitted by the microscope were marked by "⊙". Specimens on which the worn portion was not admitted visually but admitted by the microscope were marked by "○". Specimens on which the worn portion was admitted visually were marked by "Δ". Specimens which were worn extremely were marked by "X". Table 1 shows the results.

COMPARISON EXAMPLES 1 THROUGH 5

By using the silicone rubbers each having a hardness not less than 40° (except comparison example 5), the components were mixed with one another at the mixing ratio shown in table 1. After obtained rubber compositions were sheeted, the rubber compositions were molded to obtain specimens for evaluating each lens protector in the same condition as that of the example 1. In table 1, as the "Polyurethane rubber", "Knockstight" produced by Unimatec Inc. was used. Table 1 shows the results.

above-described test, it was impossible to prevent the molding from scratching the signal-recording surface of the CD-R.

The lens protector of the present invention and the optical pick-up thereof can be utilized preferably as a lens protector of DVD or an optical disc apparatus (for example, Blu-ray Disc) using a helium neon laser.

TABLE 1

|  | Example | | | | | | | | | Comparison Example | | | | |
| --- | --- | --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 | 4 | 5 |
| Mixing amount (% by weight) | | | | | | | | | | | | | | |
| Silicone rubber rubber hardness (°) | | | | | | | | | | | | | | |
| 10 | 100 | — | — | — | — | — | — | — | 40 | — | — | — | — | — |
| 20 | — | — | 90 | 50 | 90 | 90 | 50 | 40 | — | — | — | — | — | — |
| 40 | — | 100 | — | — | — | — | — | — | — | — | 60 | — | — | — |
| 50 | — | — | — | — | — | — | — | — | — | 100 | — | — | 40 | — |
| Polyurethane rubber rubber hardness (°) | | | | | | | | | | | | | | |
| 40 | — | — | — | — | — | — | — | — | — | — | — | 60 | — | 100 |
| PTFE resin (bulk) | — | — | — | — | 10 | — | — | — | — | — | 20 | — | — | — |
| PTFE resin (spherical) | — | — | 10 | 50 | — | — | — | 30 | 30 | — | — | 20 | 30 | — |
| Polyurethane particles (spherical) | — | — | — | — | — | 10 | 50 | 30 | 30 | — | 20 | 20 | 30 | — |
| Properties | | | | | | | | | | | | | | |
| Rubber hardness (°) | 10 | 40 | 24 | 28 | 25 | 22 | 26 | 31 | 22 | 50 | 45 | 47 | 61 | 40 |
| Degree of scratch on optical disk (N) | | | | | | | | | | | | | | |
| 0.2 | ○ | ○ | ◎ | ◎ | ◎ | ◎ | ◎ | ◎ | ◎ | X | Δ | X | X | X |
| 0.4 | ○ | ○ | ◎ | ◎ | ◎ | ◎ | ◎ | ◎ | ◎ | X | X | X | X | X |
| 0.6 | Δ | Δ | ◎ | ◎ | ○ | ◎ | ◎ | ◎ | ◎ | X | X | X | X | X |
| Wear resistance | ○ | ○ | ◎ | ◎ | ◎ | ◎ | ◎ | ◎ | ◎ | ○ | ◎ | ○ | ○ | ○ |

As shown in table 1, the specimen of each example was excellent in the degree of a scratch on the signal-recording surface of the CD-R and its wear resistance (lens protector). Specimens whose rubber hardness exceeded 40° were inferior in the degree of the scratch on the signal-recording surface of the CD-R.

The molding of comparison example 5 formed by molding the rubber composition containing as its base component the polyurethane rubber whose rubber hardness was 40° equal to that of the specimen of the example 2 was inferior in the degree of the scratch on the signal-recording surface of the CD-R. This is considered as follows: Because the rubber hardness of the polyurethane rubber is comparatively high, to prevent the signal-recording surface of the optical disc from being scratched, it is necessary to add a plasticizer to the rubber composition to adjust the hardness thereof. The plasticizer oozes during the rotation of the CD-R, thus scratching the signal-recording surface of the CD-R.

Other than the comparison examples, a molding was formed of natural rubber, acrylonitrile butadiene rubber (NBR), and fluororesin rubber excellent in its sliding performance. In a test conducted in a method similar to that of the

The invention claimed is:

1. A lens protector for an optical pick-up mounted at a portion of an upper surface of a lens holder opposed to an optical disc to prevent a scratch of an objective lens and said optical disc of said optical pick-up in which a surface of signal-recording layer of said optical disc is irradiated with light beams to read signals from said signal-recording layer and/or record signals on said signal-recording layer comprising a molding of a silicone rubber composition containing at least one ingredient selected from the group consisting of polyurethane particles and fluororesin powder, wherein said molding has a rubber hardness in a range of 10° to 40°, when said rubber hardness is measured in accordance with JIS-A, wherein said lens protector directly contacts a signal-recording surface of said optical disc.

2. A lens protector according to claim 1, wherein said ingredient is contained in an amount of 10 to 60% by weight based on the total weight of said silicone rubber composition.

3. A lens protector according to claim 2, wherein said compounding ingredient consists of polyurethane particles.

4. A lens protector according to claim 2, wherein said ingredient consists of fluororesin powder.

5. A lens protector according to claim 2, wherein said ingredient consists of polyurethane particles and fluororesin powder.

6. A lens protector according to claim 1, wherein said fluororesin powder and/or said polyurethane particles are spherical.

7. A lens protector according to claim 6, wherein said polyurethane particles are hollow.

8. A lens protector according to claim 6, wherein a mean diameter of said polyurethane particles is not more than 150 μm.

9. A lens protector according to claim 6, wherein said polyurethane particles are contained to said silicone rubber composition to prevent an optical disc from being scratched owing to an effect of elasticity of said polyurethane particles and an effect of reducing an area of contact between said lens protector and said optical disc.

10. A lens protector according to claim 6, wherein a mean diameter of said fluororesin powder is not more than 50 μm.

11. An optical pick-up in which a surface of signal-recording layer of an optical disc is irradiated with light beams to read signals from said signal-recording layer and/or record signals on said signal-recording layer comprising:
- an objective lens through which said light beams are irradiated to said signal-recording layer,
- a lens holder for supporting said objective lens, and
- a lens protector disposed at a portion of said lens holder opposed to said optical disc,
- wherein said lens protector is a lens protector according to claim 1.

12. An optical pick-up according to claim 11, wherein said optical disc is a Blu-ray Disc; and a diameter of said objective lens is not more than 5 mm.

* * * * *